US012585457B2

(12) United States Patent
Uehara

(10) Patent No.: US 12,585,457 B2
(45) Date of Patent: Mar. 24, 2026

(54) VEHICLE ELECTRONIC CONTROL DEVICE, UPDATE PROGRAM, AND DATA STRUCTURE

(71) Applicant: DENSO CORPORATION, Kariya-city (JP)

(72) Inventor: Kazuhiro Uehara, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 183 days.

(21) Appl. No.: 18/497,255

(22) Filed: Oct. 30, 2023

(65) Prior Publication Data

US 2024/0061672 A1 Feb. 22, 2024

Related U.S. Application Data

(63) Continuation of application No. PCT/JP2022/018438, filed on Apr. 21, 2022.

(30) Foreign Application Priority Data

May 21, 2021 (JP) ................................. 2021-086157

(51) Int. Cl.
G06F 8/65 (2018.01)
G06F 3/06 (2006.01)
G06F 9/54 (2006.01)
G06F 8/41 (2018.01)
(Continued)

(52) U.S. Cl.
CPC .............. *G06F 8/65* (2013.01); *G06F 3/0604* (2013.01); *G06F 3/0607* (2013.01); *G06F 3/0629* (2013.01); *G06F 3/0655* (2013.01);

*G06F 3/0679* (2013.01); *G06F 8/433* (2013.01); *G06F 8/654* (2018.02); *G06F 8/656* (2018.02)

(58) Field of Classification Search
CPC . G06F 8/65; G06F 8/654; G06F 8/656; G06F 8/433; G06F 3/0655; G06F 3/0604; G06F 3/0629; G06F 3/0607; G06F 3/0679
See application file for complete search history.

(56) References Cited

U.S. PATENT DOCUMENTS

| 7,546,595 | B1 | 6/2009 | Wickham et al. |
| 2020/0050378 | A1 | 2/2020 | Sakurai et al. |
| 2020/0050442 | A1* | 2/2020 | Sakurai ................... H04W 4/48 |

(Continued)

FOREIGN PATENT DOCUMENTS

| JP | 2010245716 A | 10/2010 |
| JP | 2015041334 A | 3/2015 |

(Continued)

*Primary Examiner* — Anibal Riveracruz
(74) *Attorney, Agent, or Firm* — Harness, Dickey & Pierce, P.L.C.

(57) ABSTRACT

A vehicle electronic control device includes a first execution instruction section that instructs a download processing execution section to execute the download processing, a second execution instruction section that instructs an update target node to execute installation processing and activation processing, and an execution request section that transmits an execution request to the first execution instruction section or the second execution instruction section in units of update methods, and requests execution of any of the download processing, the installation processing, and the activation processing in units of update methods.

10 Claims, 15 Drawing Sheets

(51) Int. Cl.
  *G06F 8/654* (2018.01)
  *G06F 8/656* (2018.01)

(56) References Cited

U.S. PATENT DOCUMENTS

| | | | |
|---|---|---|---|
| 2020/0183676 A1 | 6/2020 | Sakurai et al. | |
| 2020/0241771 A1 | 7/2020 | Sakurai et al. | |
| 2021/0026617 A1* | 1/2021 | Maru | G06F 8/65 |
| 2021/0132937 A1* | 5/2021 | Ishikawa | G06F 8/65 |
| 2021/0155176 A1 | 5/2021 | Harata et al. | |
| 2021/0157529 A1 | 5/2021 | Sakurai et al. | |
| 2021/0157566 A1 | 5/2021 | Sakurai et al. | |
| 2021/0157567 A1 | 5/2021 | Sakurai et al. | |
| 2021/0157568 A1 | 5/2021 | Sakurai et al. | |
| 2021/0157571 A1 | 5/2021 | Ogawa et al. | |
| 2021/0157572 A1 | 5/2021 | Harata et al. | |
| 2021/0157573 A1 | 5/2021 | Abe et al. | |
| 2021/0157575 A1 | 5/2021 | Ogawa et al. | |
| 2021/0157902 A1 | 5/2021 | Sakurai et al. | |
| 2021/0182048 A1 | 6/2021 | Harata et al. | |
| 2021/0182049 A1 | 6/2021 | Harata et al. | |
| 2021/0403016 A1* | 12/2021 | Jung | B60W 50/06 |
| 2022/0012043 A1 | 1/2022 | Sakurai et al. | |
| 2022/0107798 A1* | 4/2022 | Takatsuna | G06F 8/654 |
| 2022/0156057 A1* | 5/2022 | Kobayashi | G06F 8/65 |
| 2022/0253234 A1* | 8/2022 | Mizutani | G06F 3/0604 |
| 2022/0326932 A1* | 10/2022 | Inoue | G06F 8/65 |
| 2022/0413832 A1* | 12/2022 | Itatsu | B60R 16/02 |
| 2022/0413833 A1* | 12/2022 | Kodama | G06F 13/00 |
| 2023/0035303 A1* | 2/2023 | Shizuka | G06F 8/65 |
| 2023/0179659 A1* | 6/2023 | Go | B60R 16/023 |
| | | | 709/201 |
| 2023/0195445 A1* | 6/2023 | Ashibe | B60R 16/02 |
| | | | 717/168 |

FOREIGN PATENT DOCUMENTS

| | | |
|---|---|---|
| JP | 2020027627 A | 2/2020 |
| JP | 2021009658 A | 1/2021 |
| WO | WO-2020170407 A1 | 8/2020 |

* cited by examiner

FIG. 5

TRANSMISSION TARGET OF EXECUTION REQUEST

| UPDATE MASTER | NODE ID OF UPDATE MASTER | DOWNLOAD | INSTALLATION | ACTIVATION |
|---|---|---|---|---|
| 1ST UPDATE MASTER | 0x00A | — | ◯ | ◯ |
| 2ND UPDATE MASTER | 0x00B | — | ◯ | ◯ |
| 3RD UPDATE MASTER | 0x00C | — | ◯ | ◯ |

FIG. 6

TRANSMISSION ORDER OF EXECUTION REQUEST

| 1ST UPDATE MASTER | | 2ND UPDATE MASTER | | | 3RD UPDATE MASTER | | |
|---|---|---|---|---|---|---|---|
| DOWNLOAD | INSTALLATION | ACTIVATION | DOWNLOAD | INSTALLATION | ACTIVATION | DOWNLOAD | INSTALLATION | ACTIVATION |
| 0 | 1 | 4 | 0 | 2 | 4 | 0 | 3 | 4 |

FIG. 9

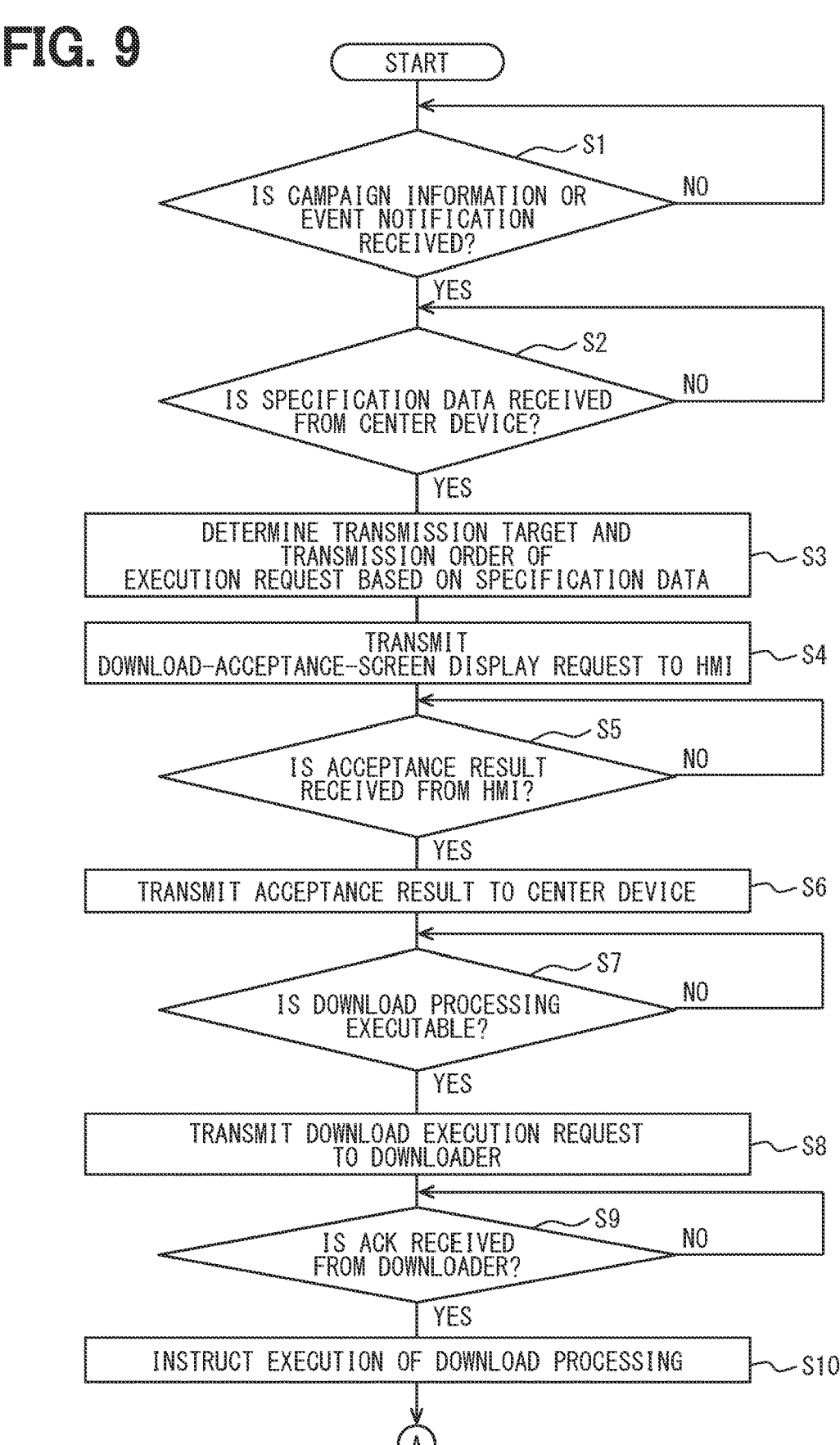

START

S1 — IS CAMPAIGN INFORMATION OR EVENT NOTIFICATION RECEIVED? — NO

YES

S2 — IS SPECIFICATION DATA RECEIVED FROM CENTER DEVICE? — NO

YES

S3 — DETERMINE TRANSMISSION TARGET AND TRANSMISSION ORDER OF EXECUTION REQUEST BASED ON SPECIFICATION DATA

S4 — TRANSMIT DOWNLOAD-ACCEPTANCE-SCREEN DISPLAY REQUEST TO HMI

S5 — IS ACCEPTANCE RESULT RECEIVED FROM HMI? — NO

YES

S6 — TRANSMIT ACCEPTANCE RESULT TO CENTER DEVICE

S7 — IS DOWNLOAD PROCESSING EXECUTABLE? — NO

YES

S8 — TRANSMIT DOWNLOAD EXECUTION REQUEST TO DOWNLOADER

S9 — IS ACK RECEIVED FROM DOWNLOADER? — NO

YES

S10 — INSTRUCT EXECUTION OF DOWNLOAD PROCESSING

A

VEHICLE ELECTRONIC CONTROL DEVICE, UPDATE PROGRAM, AND DATA STRUCTURE

CROSS REFERENCE TO RELATED APPLICATION

The present application is a continuation application of International Patent Application No. PCT/JP2022/018438 filed on Apr. 21, 2022 which designated the U.S. and claims the benefit of priority from Japanese Patent Application No. 2021-086157 filed on May 21, 2021. The entire disclosures of all of the above applications are incorporated herein by reference.

TECHNICAL FIELD

The present disclosure relates to a vehicle electronic control device, an update program, and a data structure.

BACKGROUND

A technique has been proposed in which a vehicle electronic control device functioning as a gateway ECU is provided on a vehicle side, and in the vehicle electronic control device, update data downloaded from a center device is distributed to an update target node, and software of the update target node is updated by over the air (OTA).

SUMMARY

According to one example, a vehicle electronic control device may include a first execution instruction section that instructs a download processing execution section to execute the download processing, a second execution instruction section that instructs an update target node to execute installation processing and activation processing, and an execution request section that transmits an execution request to the first execution instruction section or the second execution instruction section in units of update methods, and requests execution of any of the download processing, the installation processing, and the activation processing in units of update methods.

BRIEF DESCRIPTION OF DRAWINGS

The foregoing and other objects, features, and advantages of the present disclosure will become more apparent from the following detailed description with reference to the accompanying drawings. In the drawings.

FIG. 5 is a diagram illustrating a transmission target of an execution request in specification data;

FIG. 6 is a diagram illustrating a transmission order of the execution request in the specification data;

FIG. 9 is a first flowchart;

DETAILED DESCRIPTION

Figure 1:
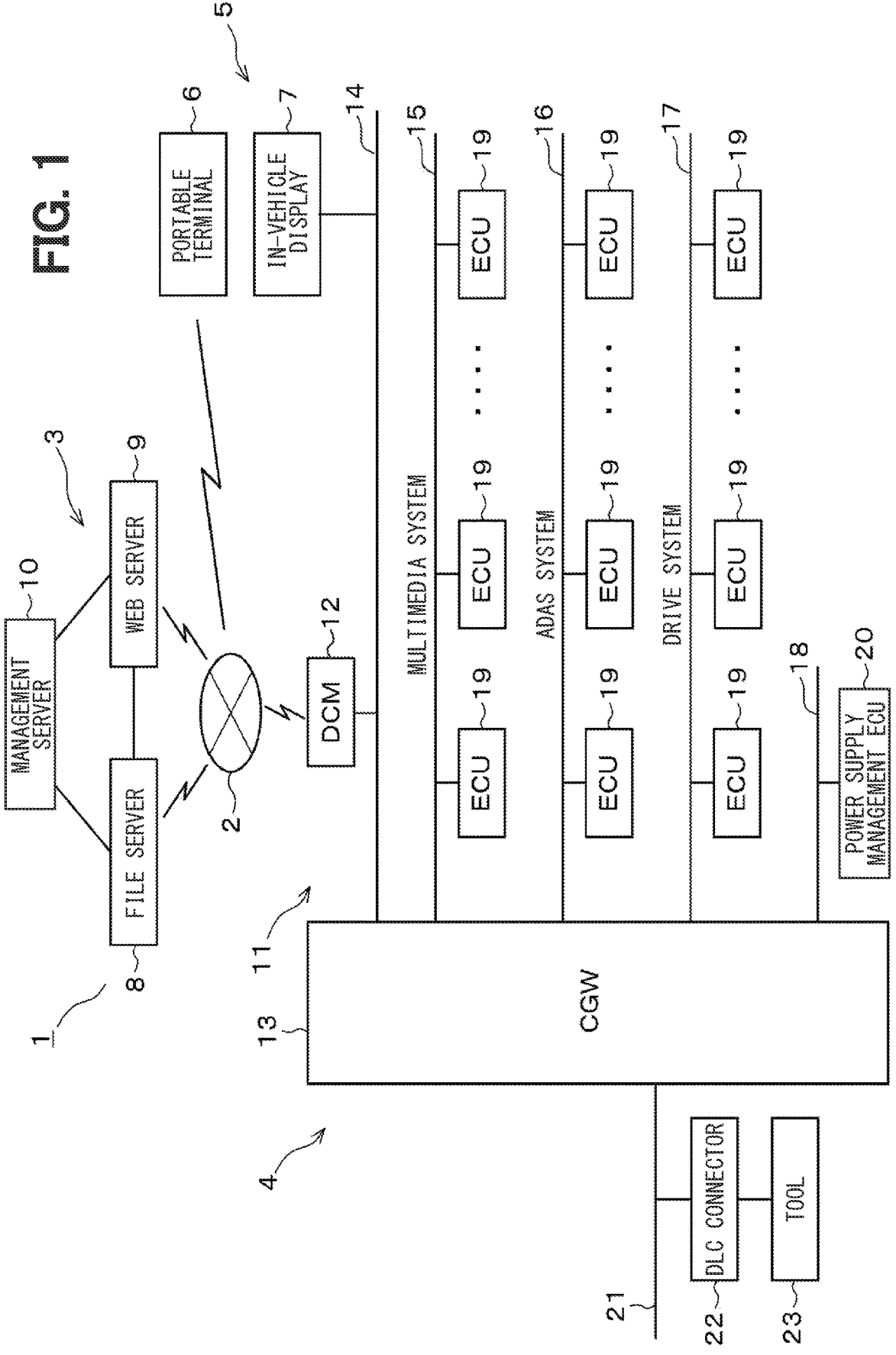
FIG. 1 is a diagram illustrating an overall configuration of one embodiment.

In recent years, with diversification of vehicle control such as a driving assistance function and an automated driving function, the scale of software including programs and data for vehicle control, diagnosis, and the like incorporated into a node such as an electronic control unit (hereinafter, referred to as "electronic control unit (ECU)") for a vehicle is increasing. In addition, with version upgrades by improving functions or the like, there is an increasing opportunity to update (reprogram) software necessary for the operation of the node. On the other hand, with the development of communication networks and the like, connected car technology has also become widespread. Under such circumstances, a technique has been proposed in which a vehicle electronic control device functioning as a gateway ECU is provided on a vehicle side, and in the vehicle electronic control device, update data downloaded from a center device is distributed to an update target node, and software of the update target node is updated by over the air (OTA).

There are a wide variety of nodes that can be update targets, and software update methods may be different from each other. For example, in a case where the software of an advanced driving assistant system (ADAS) system node for driving assistance or automated driving is updated, data is transferred by high-speed file communication, and in a case where the software of a drive system node for vehicle traveling is updated, data is transferred by diagnostic communication. The update methods are thus different from each other. Therefore, software of a plurality of update target nodes may be updated by different update methods in one piece of campaign information. In such a case, if a plurality of update methods are simultaneously executed without appropriately managing the update order, there is a possibility that the software is updated in an unintended combination.

The present disclosure provides a technique to appropriately update software in a case where the software of a plurality of update target nodes is updated by different update methods.

According to one aspect of the present disclosure, a vehicle electronic control device may include: a first execution instruction section that is configured to instruct a download processing execution section executing download processing of downloading update data from outside to execute the download processing; a second execution instruction section that is configured to instruct an update target node that executes installation processing of installing update data and generating software after update and activation processing of validating the software after update to execute the installation processing and the activation processing; and an execution request section that is configured to transmit an execution request to the first execution instruction section or the second execution instruction section in units of update methods that is based on a method or an order when the software of the update target node is updated, and to request execution of any of the download processing, the installation processing, and the activation processing in units of update methods that is based on a method or an order when the software of the update target node is updated.

By requesting the execution of any of the download processing, the installation processing, and the activation processing in units of update methods, any of the download processing, the installation processing, and the activation processing is executed in units of update methods. In a case where software of a plurality of update target nodes is updated by different update methods, it is possible to avoid a situation in which a plurality of update methods are simultaneously executed or a situation in which a plurality of update methods are executed in an inappropriate order. As a result, it is possible to avoid a situation in which the software is updated in an unintended combination, and it is possible to appropriately update the software.

An embodiment will be described below with reference to the drawings.

The vehicle electronic control system is a system in which software for vehicle control, diagnosis, and the like incorporated into an electronic control device (hereinafter, referred to as "electronic control unit (ECU)") can be updated by over the air (OTA). The software includes programs and data for implementing functions such as vehicle control and diagnosis, and can also be expressed as an application. In the present embodiment, a case where software for vehicle control, diagnosis, and the like is updated will be described, but for example, the present disclosure can also be applied to a case where a map application, map data used in the map application, or the like is updated.

As illustrated in FIG. 1, a vehicle electronic control system 1 includes a center device 3 on the side of a communication network 2, and a vehicle-side system 4 and a display terminal 5 on a vehicle side. The communication network 2 includes, for example, a mobile communication network such as a 4G line, the Internet, and Wireless Fidelity (WiFi) (registered trademark).

The display terminal 5 as a human machine interface (HMI) is a terminal having a function of receiving an operation input from a user and a function of displaying various screens, and includes, for example, a portable terminal 6 such as a smartphone or a tablet that can be carried by the user, and an in-vehicle display 7 disposed in the vehicle interior. The portable terminal 6 can perform data communication with the center device 3 via the communication network 2 as long as the portable terminal is within the communication range of the mobile communication network. The in-vehicle display 7 is connected to the vehicle-side system 4 and may also have a navigation function. Alternatively, the in-vehicle display 7 may be an in-vehicle display ECU having an ECU function, or may have a function of controlling display on a center display, a meter display, or the like.

If the user is outside the vehicle interior and within the communication range of the mobile communication network, the user can perform an operation input while checking various screens related to a software update with the portable terminal 6 and perform a procedure involved in updating the software. In the vehicle interior, the user can perform an operation input while checking various screens related to the software update on the in-vehicle display 7, and can perform the procedure involved in updating the software. That is, the user can selectively use the portable terminal 6 and the in-vehicle display 7 inside and outside the vehicle interior to perform the procedure involved in updating the software.

The center device 3 controls a software update function on the side of the communication network 2 in the vehicle electronic control system 1, and functions as an OTA center that provides an OTA service. The center device 3 includes a file server 8, a web server 9, and a management server 10, and the individual servers 8 to 10 can perform data communication with each other. That is, the center device 3 includes a plurality of different servers for each function.

The file server 8 is a server that manages software files distributed from the center device 3 to the vehicle-side system 4. The file server 8 manages update data provided from a supplier or the like, which is a provider of the software distributed from the center device 3 to the vehicle-side system 4, specification data provided from an original equipment manufacturer (OEM), a vehicle state acquired from the vehicle-side system 4, and the like.

The file server 8 can perform data communication with the vehicle-side system 4 via the communication network 2, transmits campaign information to the vehicle-side system 4, and transmits specification data to the vehicle-side system 4. When receiving a request to download package data from the vehicle-side system 4, the file server 8 transmits the package data in which update data is packaged to the vehicle-side system 4. The package data includes a compressed file in zip format. By transmitting package data in which the specification data and the update data are packaged to the vehicle-side system 4, the file server 8 may simultaneously transmit the specification data and the update data to the vehicle-side system 4.

The web server 9 is a server that manages web information. The web server 9 transmits web data managed by the web server in response to a request from a web browser included in the portable terminal 6 or the like. The management server 10 is a server that manages personal information of a user registered in a software update service, an update history of software for each vehicle, and the like.

The vehicle-side system 4 includes a vehicle master device 11. The vehicle master device 11 controls a software update function on the vehicle side in the vehicle electronic control system 1 and functions as an OTA master. The vehicle master device 11 includes a data communication module (DCM) 12 and a central gate way (CGW) 13.

The DCM 12 performs data communication with the center device 3 via the communication network 2 and corresponds to a download processing execution section. The CGW 13 functions as a gateway ECU and corresponds to a vehicle electronic control device. The DCM 12 and the CGW 13 are data-communicably connected via a first bus 14. Although FIG. 1 illustrates the configuration in which the DCM 12 and the in-vehicle display 7 are connected to the same first bus 14, the DCM 12 and the in-vehicle display 7 may be connected to separate buses. Alternatively, the CGW 13 may have some or all of the functions of the DCM 12, or the DCM 12 may have some or all of the functions of the CGW 13. That is, in the vehicle master device 11, the function sharing between the DCM 12 and the CGW 13 may be configured in any manner. The vehicle master device 11 may include two ECUs, that is, the DCM 12 and the CGW 13, or may include one integrated ECU having the function of the DCM 12 and the function of the CGW 13.

In addition to the first bus 14, a second bus 15, a third bus 16, a fourth bus 17, and a fifth bus 18 are connected to the CGW 13 as in-vehicle buses. Various ECUs 19 are connected to the CGW via the buses 15 to 17, and a power supply management ECU 20 is connected to the CGW via the bus 18. The ECU 19 corresponds to a node.

The second bus 15 is, for example, a multimedia system bus, and is connected to the ECU 19 that executes multimedia system control. The third bus 16 is, for example, an ADAS system bus for driving assistance and automated driving, and is connected to the ECU 19 that executes ADAS system control. The fourth bus 17 is, for example, a drive system bus for vehicle traveling, and is connected to the ECU 19 that executes drive system control. The buses 15 to 17 may be buses other than the multimedia system bus, the ADAS system bus, and the drive system bus. In addition, the number of buses and the number of ECUs 19 are not limited to the illustrated configurations. Furthermore, the buses do not need to be divided for each system, and may be divided based on the location of the ECU 19 to be controlled, such as the front and rear of the vehicle, or may be divided based on the system and the setting location of the ECU 19. The power supply management ECU 20 is an ECU that manages power supplied to the DCM 12, the CGW 13, the various ECUs 19, and the like.

A sixth bus 21 is connected to the CGW 13 as an out-vehicle bus. A data link coupler (DLC) connector 22 to which a tool 23 functioning as a service tool is detachably connected is connected to the sixth bus 21. The in-vehicle buses 14 to 18 and the out-vehicle bus 21 include, for example, a controller area network (CAN, registered trademark) bus, and the CGW 13 performs data communication with the DCM 12, various ECUs 19, and the tool 23 in accordance with data communication standards and diagnostic communication standards for CAN (unified diagnosis services (UDS): ISO 14229). The DCM 12 and the CGW 13 may be connected by Ethernet, or the DLC connector 22 and the CGW 13 may be connected by Ethernet.

Provided that the conditions under which package data can be downloaded are satisfied, the CGW 13 transmits a request to download package data to the center device 3 via the DCM 12. The conditions under which the package data can be downloaded include that the acceptance of the download has been obtained, that the CGW 13 can perform data communication with the center device 3 via the DCM 12, that the free capacity of the storage in the DCM 12 is equal to or more than a predetermined capacity, that the remaining capacity of the in-vehicle battery is equal to or more than a predetermined capacity, and the like. When downloading the package data from the center device 3 via the DCM 12, the CGW 13 acquires update data from the downloaded package data.

Provided that the conditions under which installation can be instructed to write the update data are satisfied, the CGW 13 instructs the software update target ECU 19 to install the acquired update data. The conditions under which installation can be instructed include that the acceptance of the installation has been obtained, that the vehicle state is in an installable state, that the update target ECU 19 is in an installable state, that the update data is normal data, that the remaining capacity of the in-vehicle battery is equal to or more than a predetermined capacity, and the like. When instructed to install the update data by the CGW 13, the update target ECU 19 executes the installation of the update data.

When the installation of the update data is completed in the update target ECU 19, provided that the conditions under which activation can be instructed to activate software after completion of installation are satisfied, the CGW 13 instructs the update target ECU 19 to activate. The conditions under which activation can be instructed include that the acceptance of the activation has been obtained, that the vehicle state is in an activatable state, that the update target ECU 19 is in an activatable state, that the remaining capacity of the in-vehicle battery is equal to or more than a predetermined capacity, and the like. When instructed to activate by the CGW 13, the update target ECU 19 executes activation.

Figure 2:
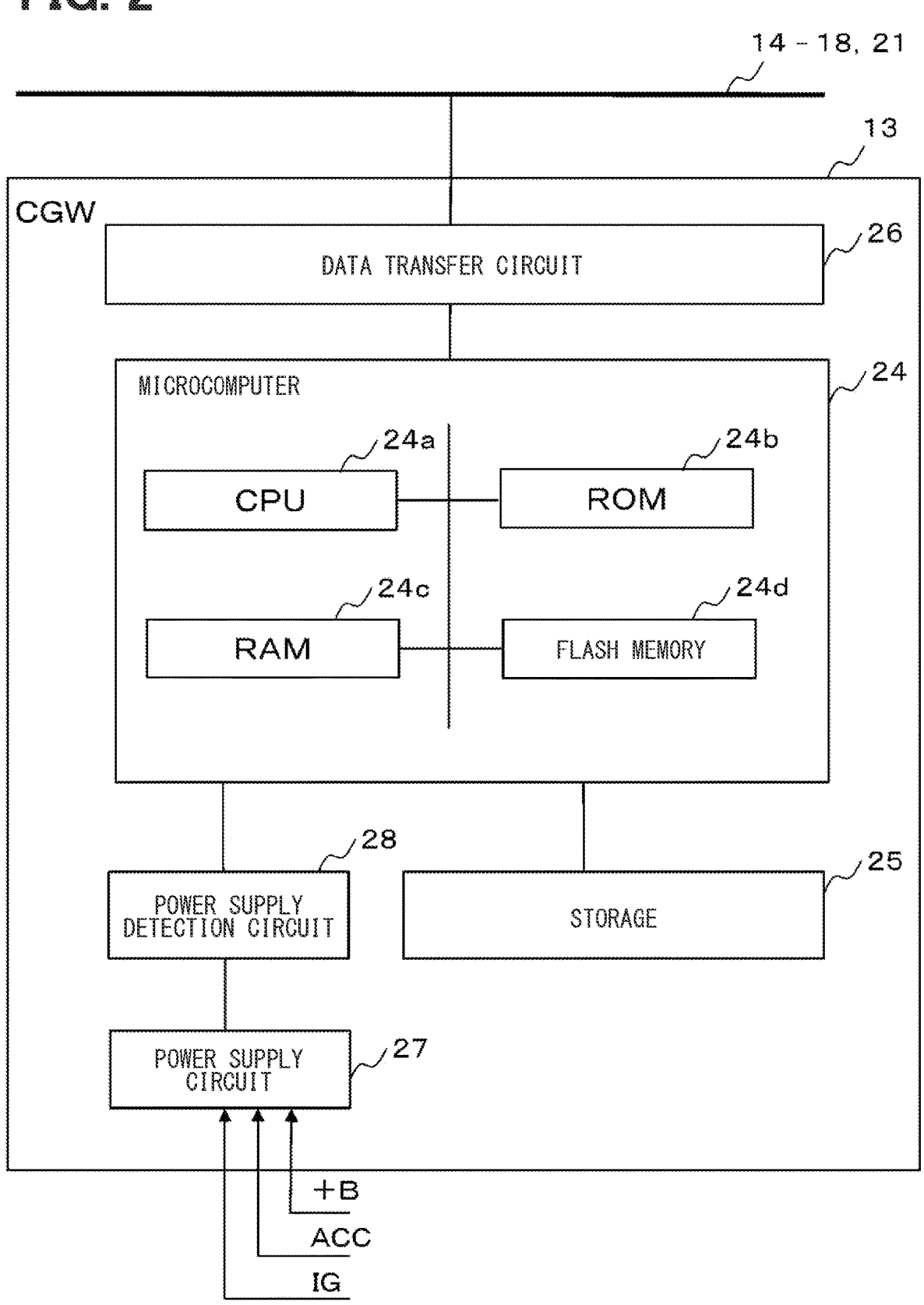
FIG. 2 is a diagram illustrating an electrical configuration of a CGW.

As illustrated in FIG. 2, the CGW 13 includes, as electrical functional blocks, a microcomputer 24, a storage 25, a data transfer circuit 26, a power supply circuit 27, and a power supply detection circuit 28. The microcomputer 24 executes various control programs stored in a non-transitory tangible storage medium to perform various processing, and controls the operation of the CGW 13. In the present embodiment, the configuration in which one microcomputer 24 is mounted on the CGW 13 is exemplified, but the number, specification, and combination of microcomputers mounted on the CGW 13 are determined based on the processing capability required for the CGW 13. That is, in a case where the CGW 13 is required to have relatively high processing capability, a microcomputer with relatively high specifications is adopted, or a plurality of microcomputers are adopted to implement distributed processing or parallel processing.

The storage 25 is, for example, an embedded Multi Media Card (eMMC) or NorFlash. The data transfer circuit 26 controls data communication conforming to CAN data communication standards, Ethernet communication standards, diagnostic communication standards, and the like with the buses 14 to 18 and 21. The power supply circuit 27 receives a battery power supply, an accessory power supply, and an ignition power supply. The power supply detection circuit 28 detects a voltage value of the battery power supply, a voltage value of the accessory power supply, and a voltage value of the ignition power supply input from the power supply circuit 27, compares these detected voltage values with a predetermined voltage threshold, and outputs comparison results to the microcomputer 24. The microcomputer 24 determines whether the battery power supply, the accessory power supply, and the ignition power supply supplied from the outside to the CGW 13 are normal or abnormal on the basis of the comparison results input from the power supply detection circuit 28.

Figure 3:
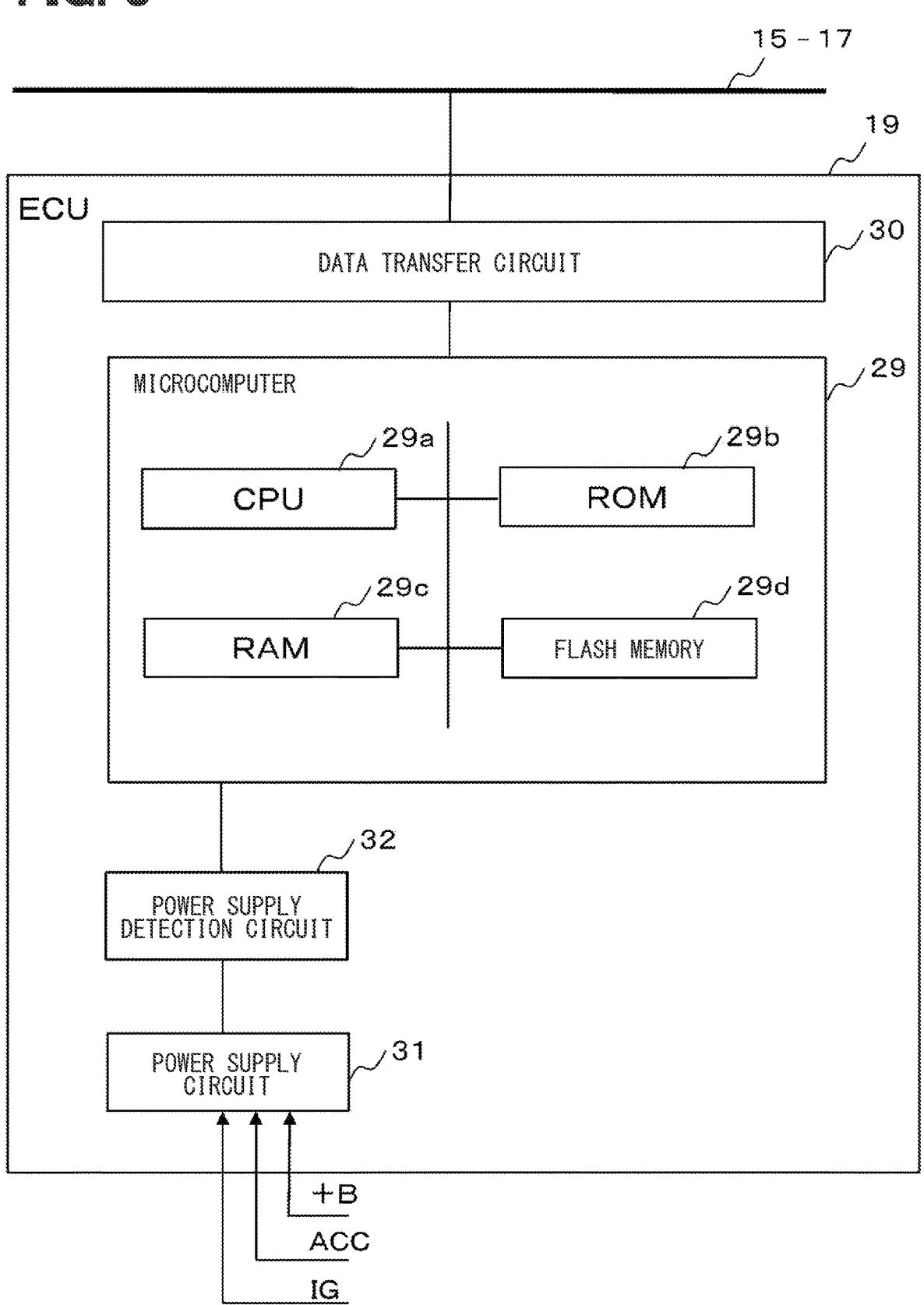
FIG. 3 is a diagram illustrating an electrical configuration of an ECU.

As illustrated in FIG. 3, the ECU 19 includes, as electrical functional blocks, a microcomputer 29, a data transfer circuit 30, a power supply circuit 31, and a power supply detection circuit 32. The microcomputer 29 includes a CPU 29a, a ROM 29b, a RAM 29c, and a flash memory 29d. The flash memory 29d includes a secure area from which information cannot be read from the outside of the ECU 19. The microcomputer 29 executes various control programs stored in a non-transitory tangible storage medium to perform various processing, and controls the operation of the ECU 19.

The data transfer circuit 30 controls data communication conforming to CAN data communication standards, Ethernet communication standards, and the like with the buses 15 to 17. The power supply circuit 31 receives a battery power supply, an accessory power supply, and an ignition power supply. The power supply detection circuit 32 detects a voltage value of the battery power supply, a voltage value of the accessory power supply, and a voltage value of the ignition power supply input from the power supply circuit 31, compares these detected voltage values with a predetermined voltage threshold, and outputs comparison results to the microcomputer 29. The microcomputer 29 determines whether the battery power supply, the accessory power supply, and the ignition power supply supplied from the outside to the ECU 19 are normal or abnormal on the basis of the comparison results input from the power supply detection circuit 32. The ECUs 19 have different loads of, for example, sensors, actuators, and the like connected thereto, but basically have the same configuration.

In the configuration described above, since there are a wide variety of ECUs 19 that can be update targets, software update methods may be different for the multimedia system ECU 19, the ADAS system ECU 19, and the drive system ECU 19. For example, in a case where the software of the advanced driving assistant system (ADAS) system ECU 19 is updated, data is transferred by high-speed file communication, and in a case where the software of the drive system ECU 19 is updated, data is transferred by diagnostic communication. The update methods are thus different from each other. For the configuration in which a plurality of ECUs 19 having different software update methods are mixed as described above, the CGW 13 adopts the following configuration. The fact that the update method is different means that the system of the ECU 19 is different even if the communication method of data transfer is the same, in addition to the fact that the communication method of data transfer is different as described above. The update method includes a method or an order when the software of the ECU 19 is updated, and more specifically, the method or the order indicates, for example, a communication method of transferring data in a storage, streaming, or the like and a type of a procedure of processing necessary for update. The number of ECUs 19 to be updated by one update method is not limited to one, and a plurality of ECUs 19 may be collectively updated.

Figure 4:
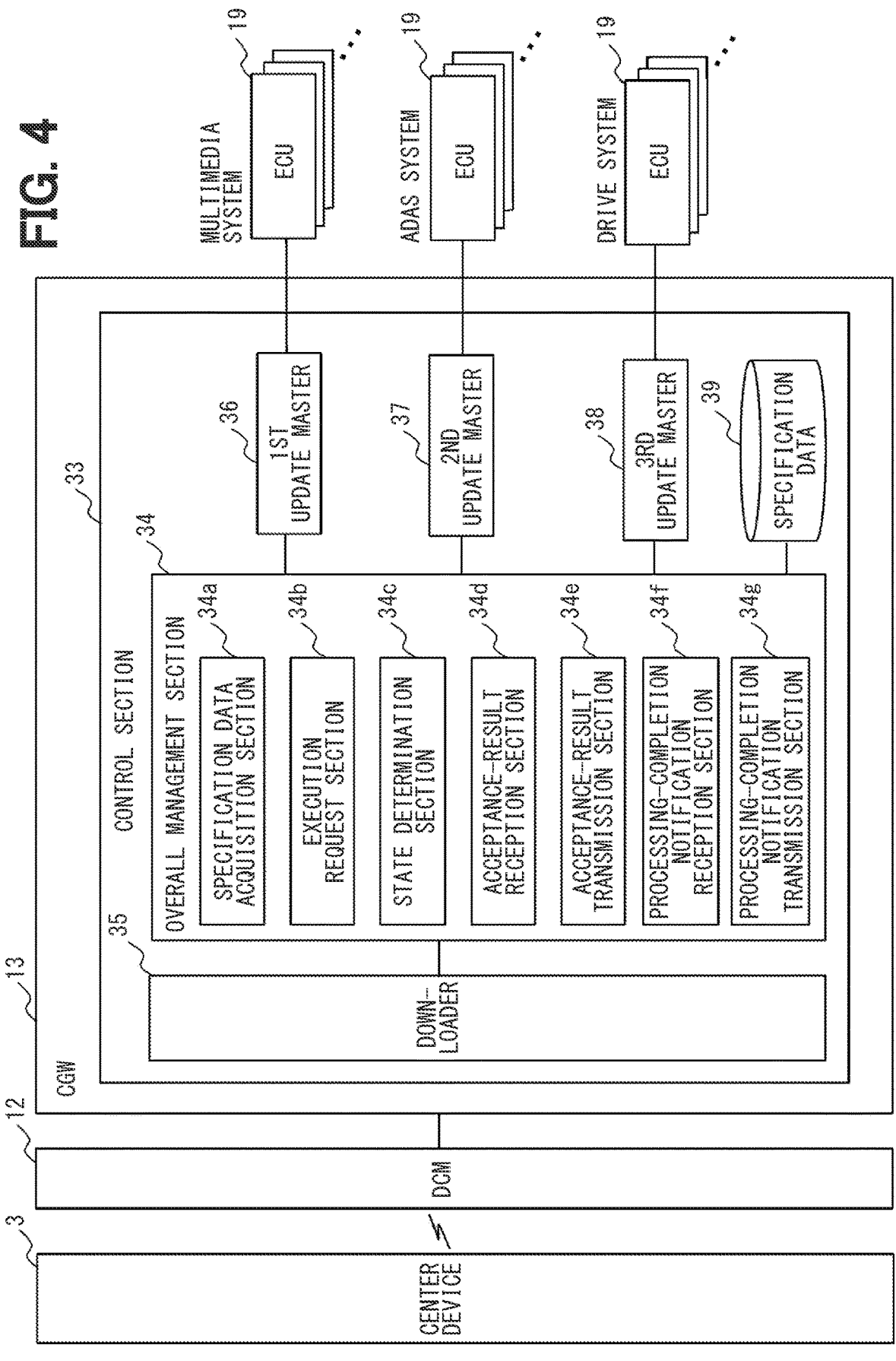
FIG. 4 is a functional block diagram of the CGW.
Figure 7:
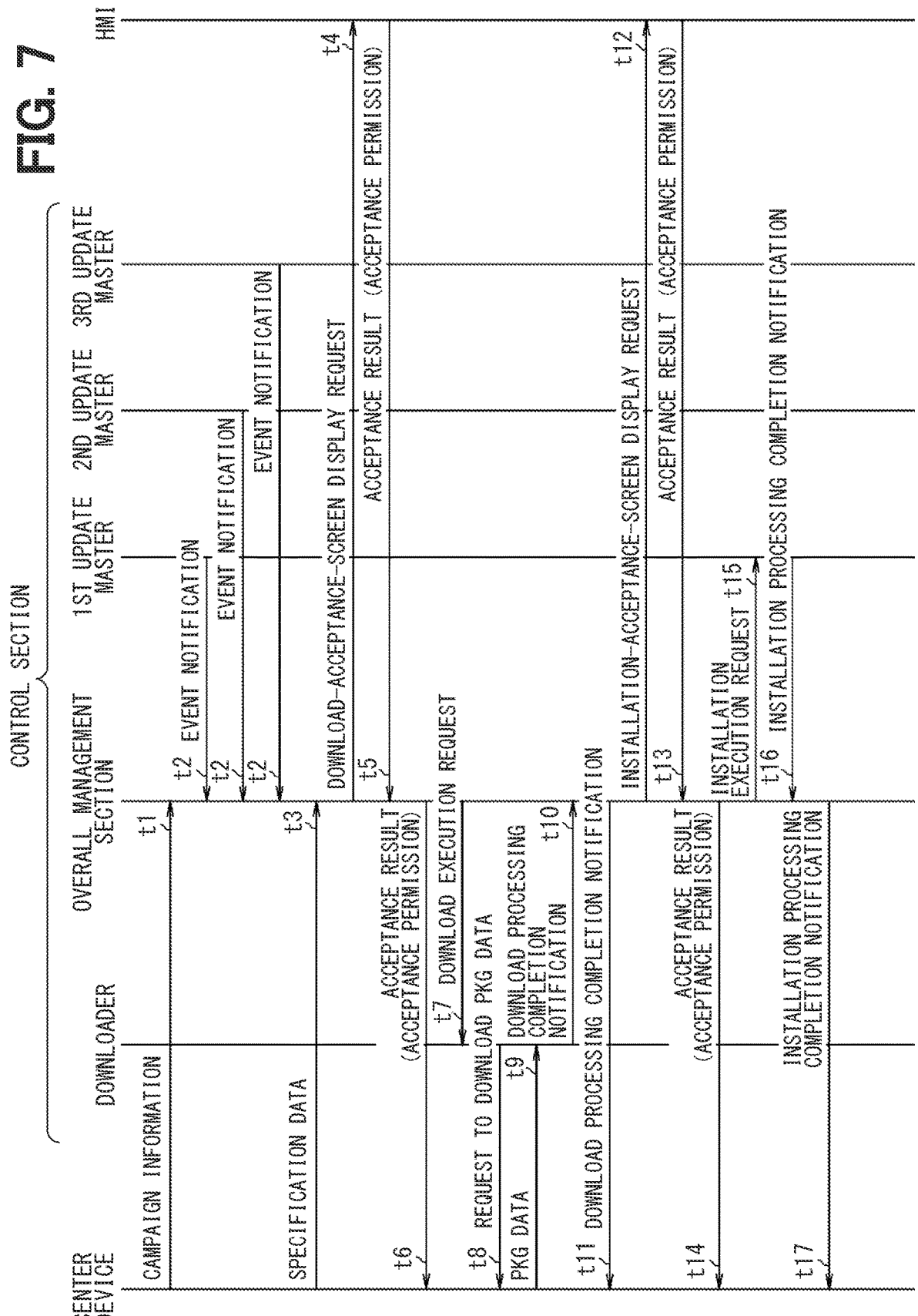
FIG. 7 is a first diagram illustrating a processing flow.
Figure 8:
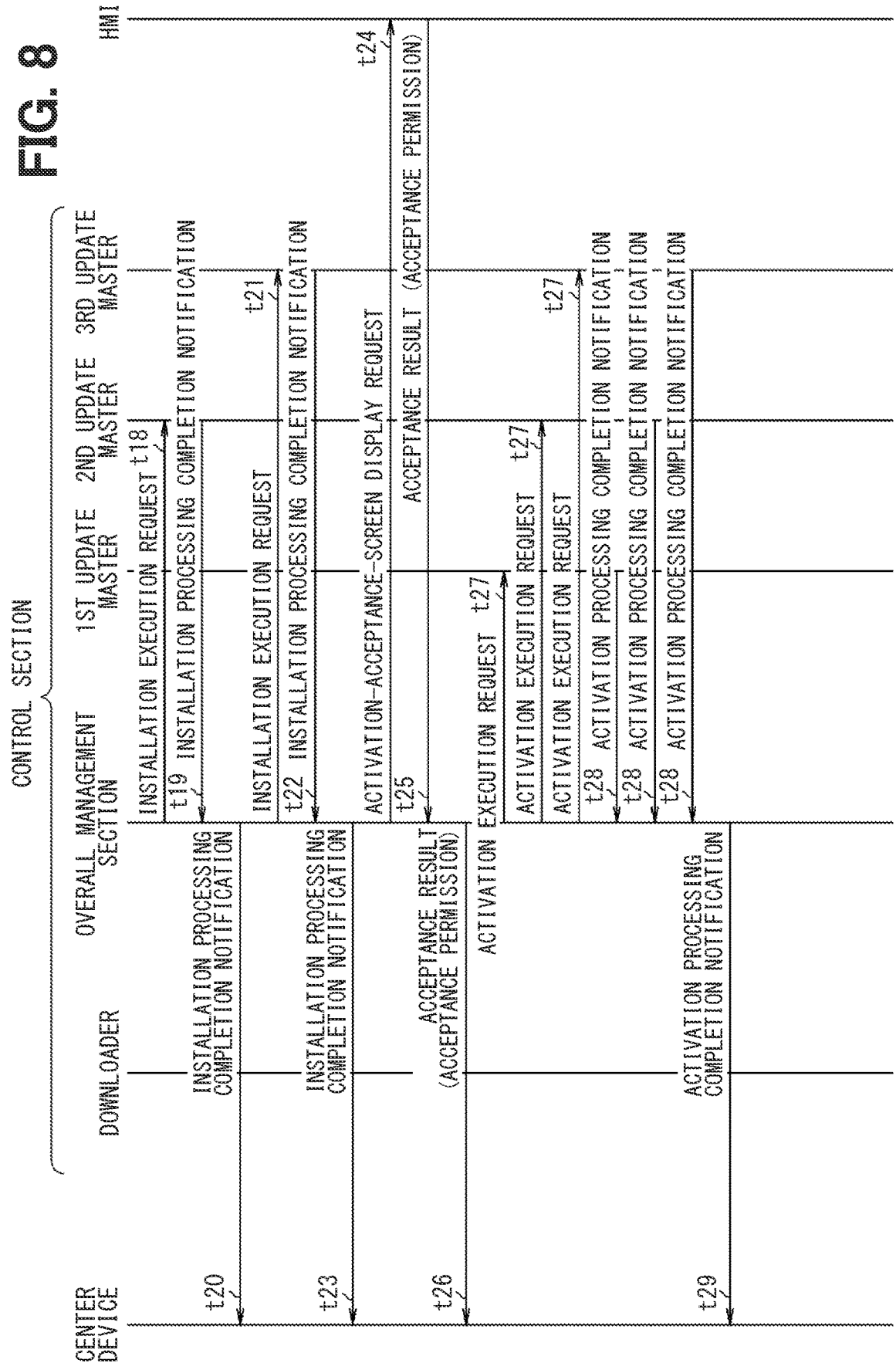
FIG. 8 is a second diagram illustrating the processing flow.
Figure 10:
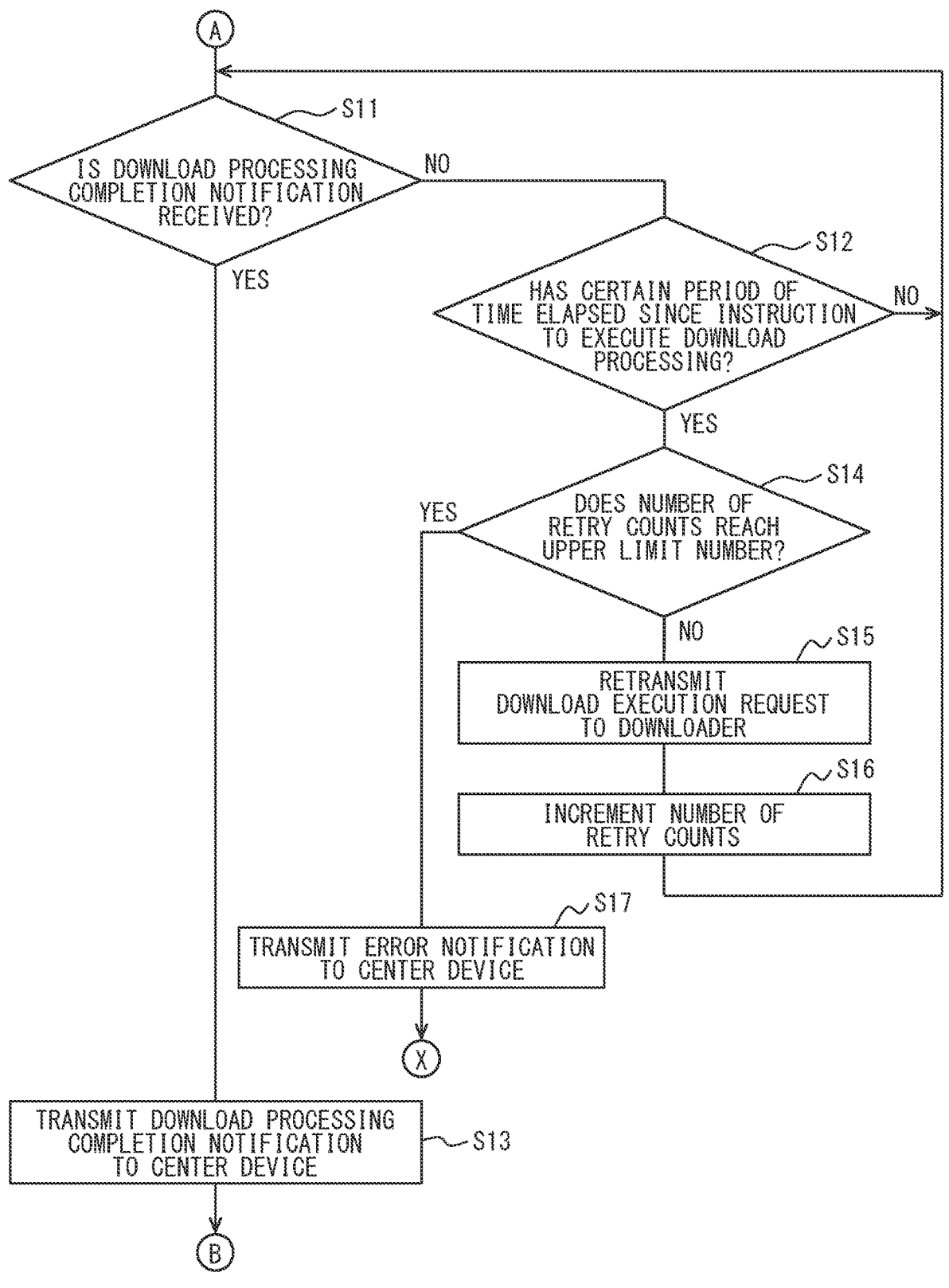
FIG. 10 is a second flowchart.
Figure 11:
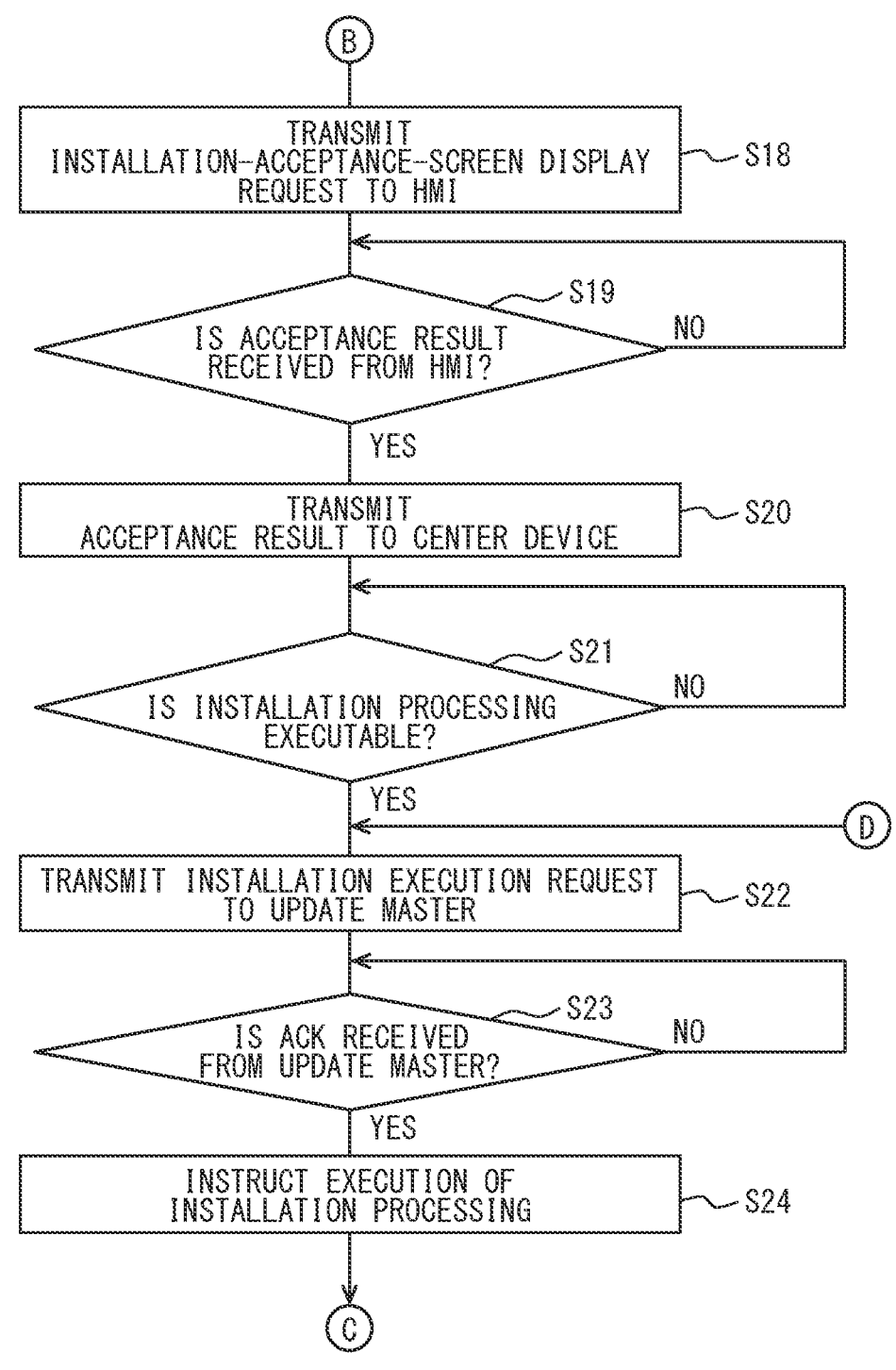
FIG. 11 is a third flowchart.
Figure 12:
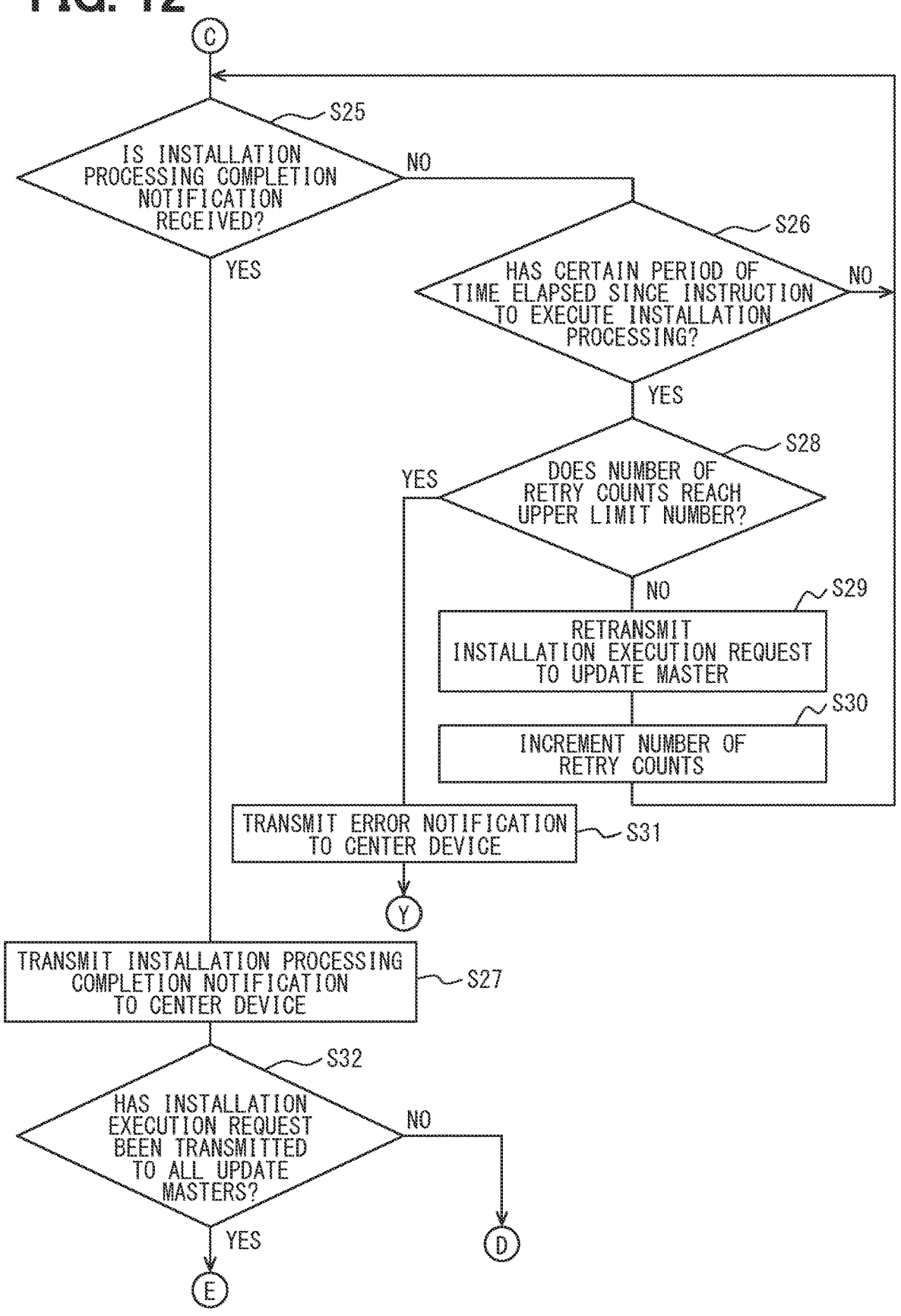
FIG. 12 is a fourth flowchart.
Figure 13:
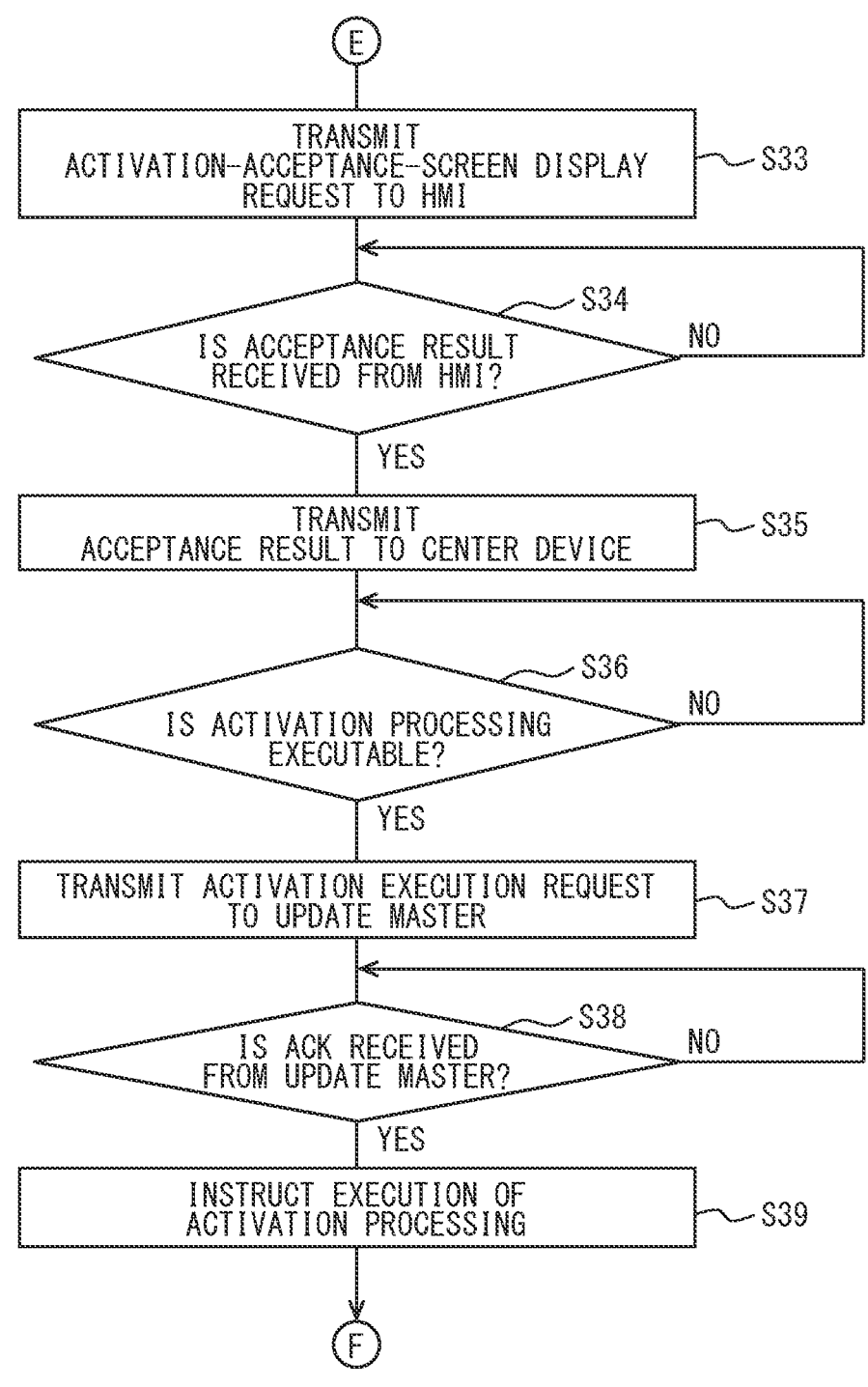
FIG. 13 is a fifth flowchart.
Figure 14:
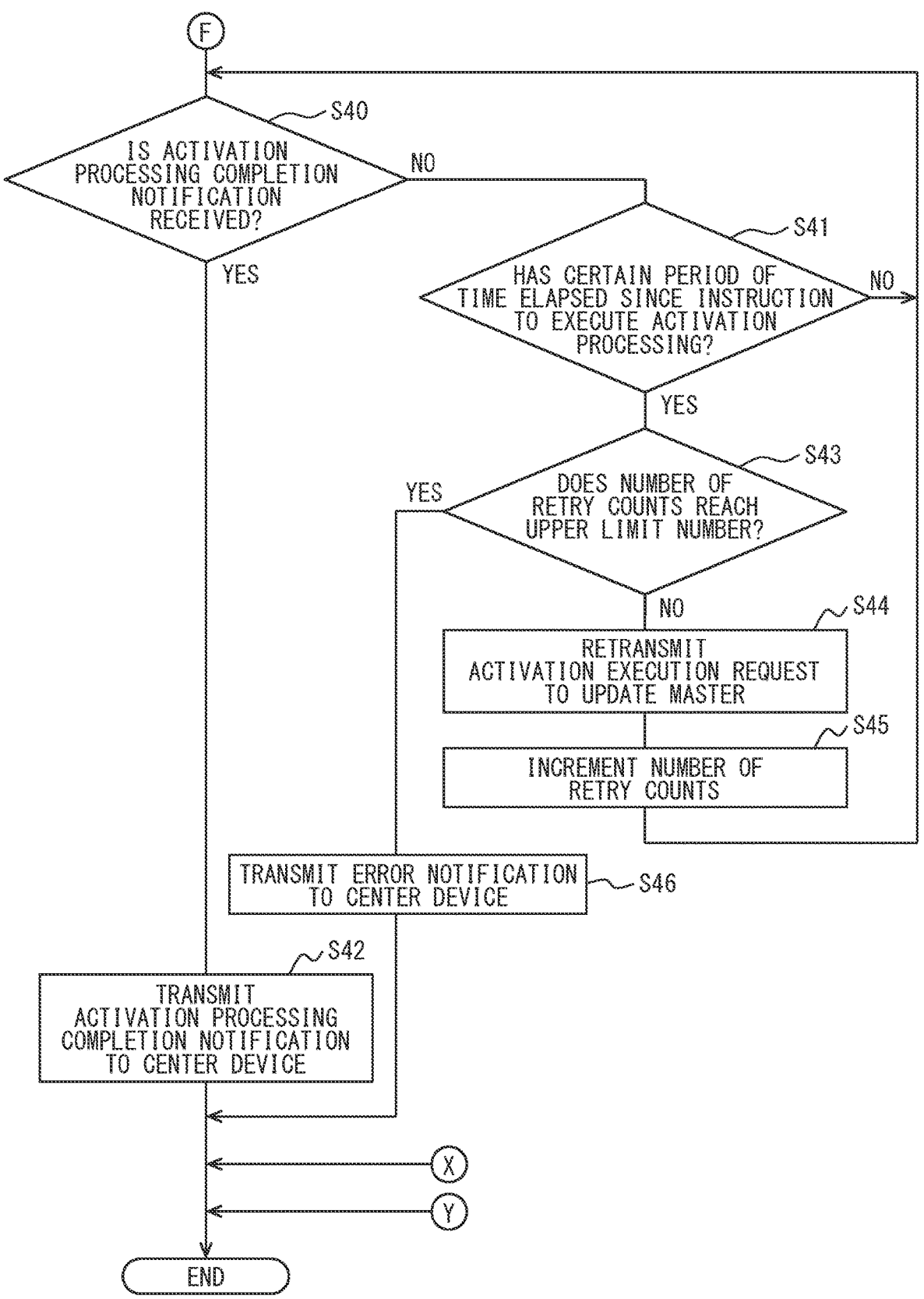
FIG. 14 is a sixth flowchart.
Figure 15:
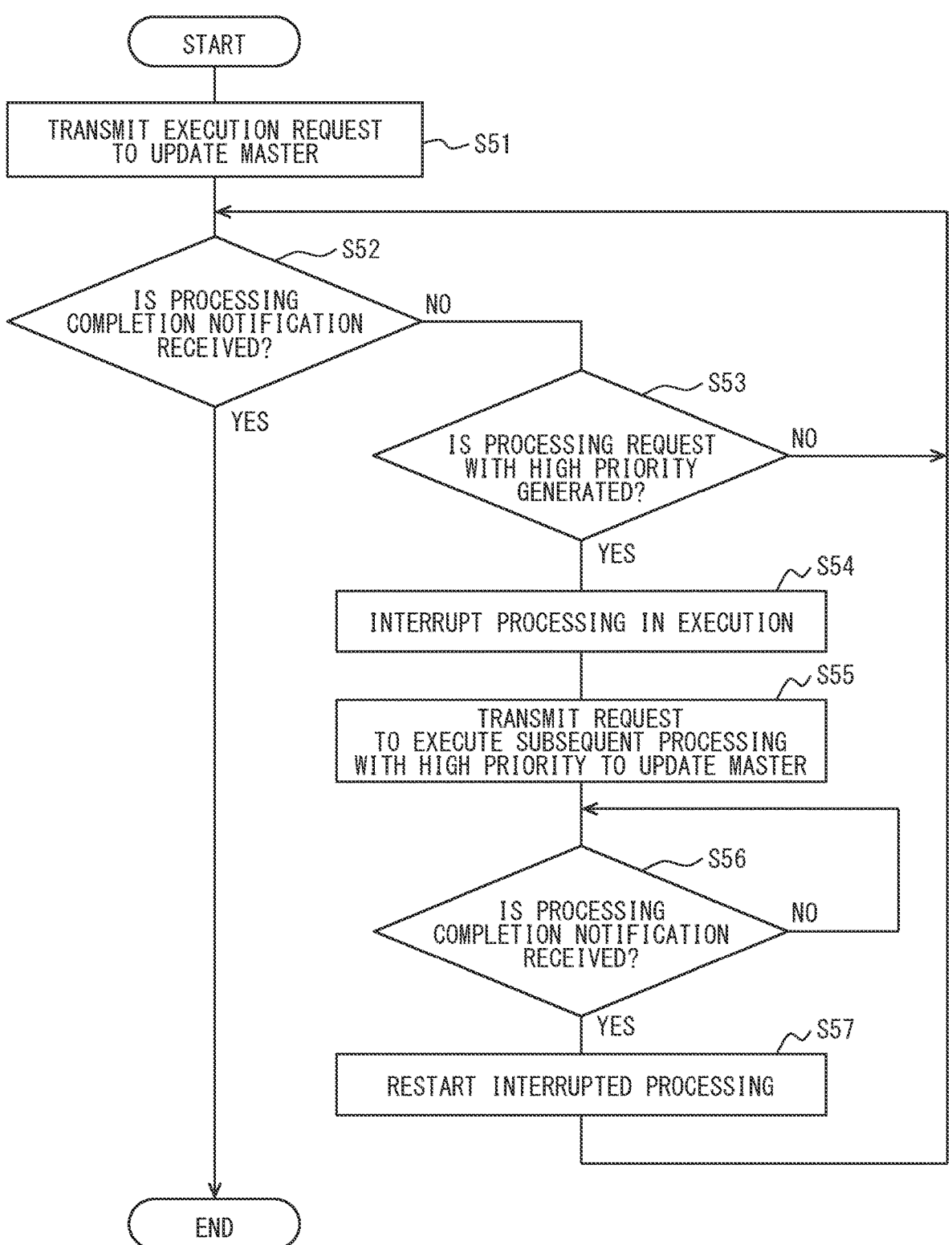
FIG. 15 is a seventh flowchart.

As illustrated in FIG. 4, the CGW 13 includes an overall management section 34, a downloader 35, a first update master 36, a second update master 37, a third update master 38, and a specification data storage section 39 in a control section 33. The downloader 35 corresponds to a first execution instruction section. The first update master 36, the second update master 37, and the third update master 38 correspond to a second execution instruction section. The overall management section 34 includes a specification data acquisition section 34a, an execution request section 34b, a state determination section 34c, an acceptance-result reception section 34d, an acceptance-result transmission section 34e, a processing-completion notification reception section 34f, and a processing-completion notification transmission section 34g. Each of the sections 34 to 38 and 34a to 34g corresponds to a function executed by the update program. That is, by executing the update program, the control section 33 performs the functions of the sections 34 to 38 and 34a to 34g. In FIG. 4, for example, the first update master 36 is connected to the multimedia system ECU 19, but the relationship between the update master and the ECU 19 may be other than such a correspondence relationship. When the first update master 36 and the ADAS system ECU 19 are connected, the first update master 36 may manage the update processing of the ADAS system ECU 19. Alternatively, the first update master 36 may manage the update processing of the drive system ECU 19.

In response to the receipt of a download execution request from the overall management section 34, the downloader 35 instructs the DCM 12 to execute download processing. The first update master 36 manages update processing of the multimedia system ECU 19, and instructs the multimedia system ECU 19 to execute installation processing in response to the receipt of an installation execution request from the overall management section 34 and to execute activation processing in response to the receipt of an activation execution request. The second update master 37 manages update processing of the ADAS system ECU 19, and instructs the ADAS system ECU 19 to execute the installation processing in response to the receipt of the installation execution request from the overall management section 34 and to execute the activation processing in response to the receipt of the activation execution request. The third update master 38 manages update processing of the drive system ECU 19, and instructs the drive system ECU 19 to execute the installation processing in response to the receipt of the installation execution request from the overall management section 34 and to execute the activation processing in response to the receipt of the activation execution request. In other words, the first update masters 36 to 38 manage the update processing of the management target ECU 19, instructs the ECU 19 to execute the installation processing in response to the receipt of the installation execution request from the overall management section 34 and to execute the activation processing in response to the receipt of the activation execution request. As an example, in the CGW 13, the overall management section 34, the downloader 35, and the update masters 36 to 38 are functionally independent modules. By adopting such a configuration, it is possible to simplify the software configuration and appropriately ensure the quality assurance of the system. Furthermore, software can be developed independently of each other, and development efficiency is improved.

The specification data acquisition section 34a acquires specification data from the package data, and stores the acquired specification data in the specification data storage section 39. The specification data includes various types of information related to software update, and as one of them, includes information related to a transmission target of an execution request illustrated in FIG. 5 and information related to a transmission order of the execution request illustrated in FIG. 6. The information related to the transmission target of the execution request includes an update master, a node ID of the update master, and items of processing to be the transmission target of the execution request. FIG. 5 illustrates that the transmission targets of the installation execution request are the first update master 36, the second update master 37, and the third update master 38, and the transmission targets of the activation execution request are also the first update master 36, the second update master 37, and the third update master 38. The information related to the transmission order of the execution request includes the priority of the installation processing and the activation processing for the update masters 36 to 38. FIG. 6 illustrates that the installation execution request is transmitted in the order of the first update master 36, the second update master 37, and the third update master 38, and the activation execution request is simultaneously transmitted to the first update master 36, the second update master 37, and the third update master 38. That is, the specification data has a data structure including information that can specify the transmission target and the transmission order of the execution request when the execution of the download processing, the installation processing, and the activation processing is requested in units of update methods. The data structure may be in another format as long as the format specifies the type of the execution request indicating whether it is download, installation, or activation, and the transmission target and transmission order of the execution request.

By transmitting the download execution request to the downloader 35, the execution request section 34b causes the downloader 35 to instruct the DCM 12 to execute the download processing, and causes the DCM 12 to execute the download processing. By transmitting the installation execution request to the update masters 36 to 38, the execution request section 34b causes the update masters 36 to 38 to instruct the update target ECU 19 to execute the installation processing, and causes the update target ECU 19 to execute the installation processing. By transmitting the activation execution request to the update masters 36 to 38, the execution request section 34b causes the update masters 36 to 38 to instruct the update target ECU 19 to execute the activation processing, and causes the update target ECU 19 to execute the activation processing.

The state determination section 34c determines whether or not the download processing can be executed, whether or not the installation processing can be executed, and whether or not the activation processing can be executed. The state determination section 34c determines whether or not the download processing is executable by determining the conditions under which the package data can be downloaded, which has been described above. The state determination section 34c determines whether or not the installation processing is executable by determining the conditions under which installation can be instructed, which has been described above. The state determination section 34c determines whether or not the activation processing is executable by determining the conditions under which activation can be instructed, which has been described above.

The acceptance-result reception section 34d receives acceptance results of the download processing, the installation processing, and the activation processing from the user. When the acceptance-result reception section 34d receives the acceptance results of the download processing, the installation processing, and the activation processing from the user, the acceptance-result transmission section 34e transmits the received acceptance results to the center device 3.

The processing-completion notification reception section 34f receives a download processing completion notification indicating completion of the download processing from the downloader 35. The processing-completion notification reception section 34f receives, from the update masters 36 to 38, an installation processing completion notification indicating completion of the installation processing and an activation processing completion notification indicating completion of the activation processing. When the download processing completion notification is received by the processing-completion notification reception section 34f, the processing-completion notification transmission section 34g transmits the received download processing completion notification to the center device 3. When the installation processing completion notification and the activation processing completion notification are received by the processing-completion notification reception section 34f, the processing-completion notification transmission section 34g transmits the received installation processing completion notification and activation processing completion notification to the center device 3.

Next, the operation of the above configuration will be described with reference to FIGS. 7 to 15. Here, as illustrated in FIGS. 5 and 6, it is assumed that the transmission target and the transmission order of the execution request are set by the specification data.

In the control section 33 of the CGW 13, when determining that the campaign information is received from the center device 3 via the DCM 12 (t1) or that the event notification is received from any of the update masters 36 to 38 (S1: YES, t2), the overall management section 34 waits for the receipt of the specification data from the center device 3 (S2). When determining that the specification data is received from the center device 3 via the DCM 12 (S2: YES, t3), the overall management section 34 stores the received specification data in the specification data storage section 39, and determines the transmission target and the transmission order of the execution request with reference to the specification data (S3). For example, as described above, the overall management section 34 determines to transmit the installation execution request in the order of the first update master 36, the second update master 37, and the third update master 38, and to simultaneously transmit the activation execution request to the first update master 36, the second update master 37, and the third update master 38.

The overall management section 34 transmits a download-acceptance-screen display request to an HMI (S4, t4) and waits for the receipt of an acceptance result from the HMI (S5). When receiving the download-acceptance-screen display request from the overall management section 34, the HMI displays a download acceptance screen, and when the user performs an operation of acceptance permission, the HMI transmits the acceptance result indicating the acceptance permission to the overall management section 34 (t5).

When determining that the acceptance result indicating the acceptance permission is received from the HMI (S5: YES), the overall management section 34 transmits the acceptance result indicating the acceptance permission to the center device 3 via the DCM 12 (S6, t6). The overall management section 34 determines whether or not the download processing is executable (S7), and when determining that the download processing is executable (S7: YES), transmits a download execution request to the downloader 35 (S8, t7, corresponding to an execution request procedure), and waits for the receipt of an ACK in response to the download execution request from the downloader 35 (S9). When receiving the download execution request from the overall management section 34, the downloader 35 returns the ACK to the overall management section 34.

When determining that the ACK is received from the downloader 35 (S9: YES), the overall management section 34 causes the downloader 35 to instruct the DCM 12 to execute the download processing (S10). When causing the downloader 35 to instruct the DCM 12 to execute the download processing, the overall management section 34 waits for the receipt of a download processing completion notification from the downloader 35 (S11), and monitors an elapsed time from the instruction to execute the download processing (S12).

When receiving the download execution request from the overall management section 34, the downloader 35 transmits a request to download package data to the center device 3 via the DCM 12 (t8). When receiving the request to download package data from the CGW 13, the center device 3 distributes the package data to the DCM 12 (t9). The DCM 12 starts the download processing of the package data from the center device 3, and when completing the download processing, transmits the download processing completion notification to the downloader 35. When receiving the download processing completion notification from the DCM 12, the downloader 35 transmits the download processing completion notification to the overall management section 34 (t10).

When determining that the download processing completion notification is received from the downloader 35 before a certain period of time has elapsed since the instruction to execute the download processing (S11: YES), the overall management section 34 transmits the download processing completion notification to the center device 3 via the DCM 12 (S13, t11).

On the other hand, when determining that, before the download processing completion notification is received from the downloader 35, a certain time has elapsed since the instruction to execute the download processing (S12: YES), the overall management section 34 determines whether or not the number of retry counts reaches a preset upper limit number (S14). When determining that the number of retry counts does not reach the upper limit number (S14: NO), the overall management section 34 retransmits the download execution request to the downloader 35 (S15), increments the number of retry counts (S16), and returns to steps S11 and S12. When determining that the number of retry counts reaches the upper limit number (S14: YES), the overall management section 34 transmits an error notification indicating an error in the download processing to the center device 3 via the DCM 12 (S17).

When the download processing performed by the DCM 12 is completed, the overall management section 34 transmits an installation-acceptance-screen display request to the HMI (S18, t12) and waits for the receipt of an acceptance result from the HMI (S19). When receiving the installation-acceptance-screen display request from the overall management section 34, the HMI displays an installation acceptance screen, and when the user performs the operation of acceptance permission, the HMI transmits the acceptance result indicating the acceptance permission to the overall management section 34 (t13).

When determining that the acceptance result indicating the acceptance permission is received from the HMI (S19: YES), the overall management section 34 transmits the acceptance result indicating the acceptance permission to the center device 3 via the DCM 12 (S20, t14). The overall management section 34 determines whether or not the installation processing is executable (S21), and when determining that the installation processing is executable (S21: YES), for the update master 36 with the highest priority of the installation processing among the update masters 36 to 38, which are software update targets, transmits the installation execution request to the update master 36 (S22, t15, corresponding to the execution request procedure), and waits for the receipt of the ACK in response to the installation execution request from the update master 36 (S23). When receiving the installation execution request from the overall management section 34, the update master 36 returns the ACK to the overall management section 34.

When determining that the ACK is received from the update master 36 (S23: YES), the overall management section 34 causes the update master 36 to instruct the update target ECU 19 to execute the installation processing (S24). When causing the update master 36 to instruct the update target ECU 19 to execute the installation processing, the overall management section 34 waits for the receipt of an installation processing completion notification from the update master 36 (S25) and monitors an elapsed time from the instruction to execute the installation processing (S26).

The update target ECU 19 managed by the update master 36 starts the installation processing when instructed to execute the installation processing by the update master 36, and when completing the installation processing, transmits the installation processing completion notification to the update master 36. When receiving the installation processing completion notification from the update target ECU 19, the update master 36 transmits the installation processing completion notification to the overall management section 34 (t16). In this case, if there are a plurality of update target ECUs 19 managed by the update master 36, the update master 36 transmits the installation processing completion notification to the overall management section 34 when receiving the installation processing completion notification from all the update target ECUs 19.

When determining that the installation processing completion notification is received from the update master 36 before a certain period of time has elapsed since the update master 36 was instructed to execute the installation processing (S25: YES), the overall management section 34 transmits the installation processing completion notification to the center device 3 via the DCM 12 (S27, t17).

On the other hand, when determining that, the installation processing completion notification is received from the update master 36, a certain period of time has elapsed since the update master 36 was instructed to execute the installation processing (S26: YES), the overall management section 34 determines whether or not the number of retry counts reaches a preset upper limit number (S28). When determining that the number of retry counts does not reach the upper limit number (S28: NO), the overall management section 34 retransmits the installation execution request to the update master 36 (S29), increments the number of retry counts (S30), and returns to steps S25 and S26. When determining that the number of retry counts reaches the upper limit number (S28: YES), the overall management section 34 transmits an error notification indicating an error in the installation processing to the center device 3 via the DCM 12 (S31).

The overall management section 34 determines whether or not the installation execution request has been transmitted to all the update masters 36 to 38 that are the transmission targets of the installation execution request in the current campaign information (S32). When determining that the installation execution request has not been transmitted to all the update masters 36 to 38, which are the transmission targets, and there are update masters 36 to 38 to which the installation execution request has not been transmitted (S32: NO), the overall management section 34 sets the update master 37 with the next highest priority among the update masters 36 to 38 that are the software update targets to the target, returns to step S22, and repeats step S22 and subsequent steps.

As illustrated in FIG. 6, in a case where the priority of the installation processing is set in the order of the first update master 36, the second update master 37, and the third update master 38, the overall management section 34 transmits the installation execution request in the order of the first update master 36, the second update master 37, and the third update master 38 to sequentially instruct the update target multimedia system ECU 19 to execute the installation processing, the update target ADAS system ECU 19 to execute the installation processing, and the update target drive system ECU 19 to execute the installation processing (t15 to t23).

On the other hand, when determining that the installation execution request has been transmitted to all the update masters 36 to 38, which are the transmission targets, there is no update masters 36 to 38 to which the installation execution request has not been transmitted (S32: YES), and the installation processing performed by the update masters 36 to 38 is completed, the overall management section 34 transmits an activation-acceptance-screen display request to the HMI (S33, t24) and waits for the receipt of an acceptance result from the HMI (S34). When receiving the activation-acceptance-screen display request from the overall management section 34, the HMI displays an activation acceptance screen, and when the user performs the operation of acceptance permission, the HMI transmits the acceptance result indicating the acceptance permission to the overall management section 34 (t25).

When determining that the acceptance result indicating the acceptance permission is received from the HMI (S34:

YES), the overall management section 34 transmits the acceptance result indicating the acceptance permission to the center device 3 via the DCM 12 (S35, t26). When determining that the activation processing is executable (S36: YES), the overall management section 34 simultaneously transmits an activation execution request to the update masters 36 to 38 (S37, t27, corresponding to the execution request procedure), and waits for the receipt of the ACK in response to the activation execution request from the update masters 36 to 38 (S38). When receiving the activation execution request from the overall management section 34, the update masters 36 to 38 return the ACK to the overall management section 34.

When determining that the ACK is received from the update masters 36 to 38 (S38: YES), the overall management section 34 causes the update masters 36 to 38 to simultaneously instruct the update target ECUs 19 to execute the activation processing (S39). When causing the update masters 36 to 38 to simultaneously instruct the update target ECUs 19 to execute the activation processing, the overall management section 34 waits for the receipt of an activation processing completion notification from the update masters 36 to 38 (S40) and monitors an elapsed time from the instruction to simultaneously execute the activation processing (S41).

The update target ECUs 19 managed by the update masters 36 to 38 start the activation processing when instructed to execute the activation processing by the update masters 36 to 38, and when completing the activation processing, transmits the activation processing completion notification to the update masters 36 to 38. When receiving the activation processing completion notification from the update target ECUs 19, the update masters 36 to 38 transmit the activation processing completion notification to the overall management section 34 (t28). In this case, if there are a plurality of update target ECUs 19 managed by each of the update masters 36 to 38, the update masters 36 to 38 transmit the activation processing completion notification to the overall management section 34 when receiving the activation processing completion notification from all the update target ECUs 19.

When determining that the activation processing completion notification is received from the update masters 36 to 38 before a certain period of time has elapsed since the instruction to execute the activation processing (S40: YES), the overall management section 34 transmits the activation processing completion notification to the center device 3 via the DCM 12 (S42, t29).

On the other hand, when determining that, before the activation processing completion notification is received from the update masters 36 to 38, a certain period of time has elapsed since the instruction to execute the activation processing (S41: YES), the overall management section 34 determines whether or not the number of retry counts reaches a preset upper limit number (S43). When determining that the number of retry counts does not reach the upper limit number (S43: NO), the overall management section 34 retransmits the activation execution request to the update masters 36 to 38 (S44), increments the number of retry counts (S45), and returns to steps S40 and S41. When determining that the number of retry counts reaches the upper limit number (S43: YES), the overall management section 34 transmits an error notification indicating an error in the installation processing to the center device 3 via the DCM 12 (S46).

Meanwhile, for example, there may be a case where, after the installation execution request is transmitted to any update master, a processing request with a high priority such as laws and regulations is generated before the installation processing is completed in the update target ECU 19 managed by the update master. In such a case, the overall management section 34 performs the processing illustrated in FIG. 15.

When transmitting the execution request to any update master (S51), the overall management section 34 determines whether or not a processing completion notification for a request to execute the processing in execution is received (S52), and determines whether or not a processing request with a high priority is generated (S53). When determining that the processing request with a high priority is generated before receiving the processing completion notification for the request to execute the processing in execution (S53: YES), the overall management section 34 transmits a request to interrupt the processing in execution to the update master, interrupts the processing in execution (S54), and transmits a request to execute the subsequent processing with a high priority to the update master (S55).

When transmitting the request to execute the subsequent processing with a high priority to the update master, the overall management section 34 determines whether or not a processing completion notification for the request to execute the subsequent processing with a high priority is received (S56). When determining that the processing completion notification for the request to execute the subsequent processing with a high priority is received (S56: YES), the overall management section 34 transmits a request to restart the interrupted processing to the update master, restarts the interrupted processing (S57), and returns to steps S52 and S53. The same holds true for a case where, after the activation execution request is transmitted to any update master, a processing request with a high priority such as laws and regulations is generated before the activation processing is completed in the update target ECU 19 managed by the update master.

As described above, according to the embodiment, the following operational effects can be obtained.

In the CGW 13, by requesting the execution of the download processing, the installation processing, and the activation processing in units of update methods, the download processing, the installation processing, and the activation processing are executed in units of update methods. In a case where software of a plurality of update target ECUs 19 is updated by different update methods, it is possible to avoid a situation in which a plurality of update methods are simultaneously executed or a situation in which a plurality of update methods are executed in an inappropriate order. As a result, it is possible to avoid a situation in which the software is updated in an unintended combination, it is possible to appropriately update the software, and it is possible to ensure safe and secure software update.

In the CGW 13, the update masters 36 to 38 are provided in units of update methods. Therefore, by integrating the control of the software update in the update masters 36 to 38, it is possible to simplify the software configuration and appropriately ensure the quality assurance of the system.

In the CGW 13, since the transmission target and the transmission order of the execution request are set by the specification data, the content of the software update can be easily switched by the specification data, and it is not necessary to individually prepare CGWs 13 applied to various systems, and the number of product numbers can be reduced.

In the CGW 13, provided that it is determined that the download processing, the installation processing, and the activation processing are executable, the request to execute the executable processing is transmitted, so that the execution of the download processing, the installation processing, and the activation processing can be ensured.

In the CGW 13, when the acceptance results of the download processing, the installation processing, and the activation processing are received from the user, the received acceptance results are transmitted to the center device 3, so that the acceptance results of the download processing, the installation processing, and the activation processing from the user can be managed by the center device 3.

In the CGW 13, when the download processing completion notification, the installation processing completion notification, and the activation processing completion notification are received, the received processing completion notifications are transmitted to the center device 3, so that the completion of the download processing, the installation processing, and the activation processing from the user can be managed by the center device 3.

In the CGW 13, when the conditions for retransmitting the execution request from the overall management section 34 are satisfied, the execution request is retransmitted. Therefore, it is possible to appropriately handle a case where the processing is not executed for some reason even though the overall management section 34 transmits the execution request.

In the CGW 13, in a case where the priority of the subsequent processing is higher than the priority of the processing in execution, the processing in execution is interrupted, the request to execute the subsequent processing is transmitted, and the restart of the interrupted processing is requested after the subsequent processing is completed. Therefore, it is possible to appropriately handle a case where a processing request with a high priority such as laws and regulations is generated.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

The configuration in which three update masters 36 to 38 are provided to manage the update processing of three types of systems of ECUs 19 has been exemplified, but two or less update masters or four or more update masters may be provided to manage the update processing of two or less types or four or more types of systems of ECUs 19. That is, one update master may be provided to manage the update processing of one type of system of the ECU 19.

Although the configuration in which the activation execution request is simultaneously transmitted to the first update master 36, the second update master 37, and the third update master 38 has been exemplified, the activation execution request may be transmitted to the first update master 36, the second update master 37, and the third update master 38 at individual timings.

The configuration in which when determining that the specification data is received, the overall management section 34 determines the transmission target and the transmission order of the execution request with reference to the specification data has been exemplified, but only the first transmission target of the execution request may be determined, and the next transmission target of the execution request may be determined each time the processing completion notification is received.

The configuration in which the DCM 12 downloads the package data from the center device 3 to acquire the update data has been exemplified, but the update target ECU 19 may have the function of the downloader 35, and thus the update target ECU 19 may directly download the package data from the center device 3 to acquire the update data.

The download acceptance, the installation acceptance, and the activation acceptance are not necessary in the individual processing. For example, the installation acceptance and the activation acceptance may be performed by a single acceptance.

The control section and the pattern thereof described in the present disclosure may be implemented by a dedicated computer provided by configuring a processor and a memory programmed to execute one or a plurality of functions embodied by a computer program. Alternatively, the control section and the pattern thereof described in the present disclosure may be implemented by a dedicated computer provided by configuring a processor with one or more dedicated hardware logic circuits. Alternatively, the control section and the pattern thereof described in the present disclosure may be implemented by one or more dedicated computers configured by a combination of a processor and a memory programmed to execute one or a plurality of functions and a processor configured with one or more hardware logic circuits. The computer program may be stored in a non-transitory computer readable storage medium as an instruction executed by a computer.

What is claimed is:

1. A vehicle electronic control device comprising:
at least one of (i) a circuit and (ii) a processor with a memory storing computer program code executable by the processor, the at least one of the circuit and the processor configured to cause the vehicle electronic control device to implement:
a first execution instruction section that is configured to instruct a download processing execution section executing download processing of downloading update data from a server installed outside the vehicle electronic control device to execute the download processing;
a second execution instruction section that is configured to instruct an update target node that executes installation processing of installing update data and generating software after update and activation processing of validating the software after the update to execute the installation processing and the activation processing; and
an execution request section that is configured to transmit an execution request to the first execution instruction section or the second execution instruction section in units of update methods that is based on a communication method or a type of processing procedure when the software of the update target node is updated, and to request execution of any of the download processing, the installation processing, and the activation processing in units of update methods that is based on the communication method or the type of processing procedure when the software of the update target node is updated,
wherein
the execution request section is configured to transmit, to the second execution instruction section, the execution request related to the installation processing in units of update methods, such that the installation processing is collectively requested in units of update methods.

2. The vehicle electronic control device according to claim 1, wherein the at least one of the circuit and the processor is further configured to implement:

a specification data acquisition section that is configured to acquire specification data from outside, wherein the execution request section determines a transmission target and a transmission order of the execution request based on the specification data.

3. The vehicle electronic control device according to claim 2, wherein the execution request section determines, with respect to the download processing, the installation processing, and the activation processing, the transmission target and the transmission order of the execution request before requesting execution of the download processing.

4. The vehicle electronic control device according to claim 2, wherein the execution request section determines a next transmission target of the execution request each time any of the download processing, the installation processing, and the activation processing is completed.

5. The vehicle electronic control device according to claim 1, wherein the at least one of the circuit and the processor is further configured to implement:

a state determination section that is configured to determine a state, wherein under a condition that the state determination section determines that the download processing, the installation processing, and the activation processing are executable, the execution request section requests execution of executable processing.

6. The vehicle electronic control device according to claim 1, wherein the at least one of the circuit and the processor is further configured to implement:

an acceptance-result reception section that is configured to receive an acceptance result from a user related to any of the download processing, the installation processing, and the activation processing; and an acceptance-result transmission section that is configured to transmit the acceptance result received to the server installed outside the vehicle electronic control device when any acceptance result is received by the acceptance-result reception section.

7. The vehicle electronic control device according to claim 1, wherein the first execution instruction section transmits a download processing completion notification when specifying completion of the download processing, and the second execution instruction section transmits an installation processing completion notification when specifying completion of the installation processing, and transmits an activation processing completion notification when specifying completion of the activation processing, and the vehicle electronic control device further comprising:

a processing-completion notification reception section that is configured to receive any of the download processing completion notification, the installation processing completion notification, and the activation processing completion notification; and a processing-completion notification transmission section that is configured to transmit the processing completion notification received to the server installed outside the vehicle electronic control device when any processing completion notification is received by the processing-completion notification reception section.

8. The vehicle electronic control device according to claim 1, wherein after transmitting the execution request to the first execution instruction section or the second execution instruction section in units of update methods, when any of the download processing, the installation processing, and the activation processing is not executed and a condition for retransmitting the execution request is satisfied, the execution request section retransmits the execution request.

9. The vehicle electronic control device according to claim 1, wherein in a case where priority of subsequent processing is higher than priority of processing in execution, the execution request section interrupts the processing in execution, transmits a request to execute the subsequent processing, and requests restart of the processing interrupted after completion of the subsequent processing.

10. A non-transitory computer readable storage medium storing an update program that causes a control section of a vehicle electronic control device to execute an execution request procedure, the vehicle electronic control device including a first execution instruction section that instructs a download processing execution section that executes download processing of downloading update data from outside to execute the download processing, and a second execution instruction section that instructs an update target node that executes installation processing of installing update data and generating software after update and activation processing of validating the software after the update to execute the installation processing and the activation processing, and the execution request procedure comprising:

transmitting an execution request to the first execution instruction section or the second execution instruction section in units of update methods that is based on a communication method or a type of processing procedure when the software of the update target node is updated; and requesting execution of any of the download processing, the installation processing, and the activation processing in units of update methods that is based on the communication method or the type of processing procedure when the software of the update target node is updated, wherein the execution request related to the installation processing in units of update methods is transmitted, such that the installation processing is collectively requested in units of update methods.

* * * * *